United States Patent [19]

Halvis et al.

[11] Patent Number: 5,164,832
[45] Date of Patent: Nov. 17, 1992

[54] CLIPPED DYNAMIC RANGE COMPRESSION IMAGE SENSING APPARATUS

[75] Inventors: James Halvis, Severna Park; Timothy F. Henricks, Bowie; Thomas E. Wilson, Laurel, all of Md.

[73] Assignee: Westinghouse Electric Corp., Pittsburgh, Pa.

[21] Appl. No.: 666,776

[22] Filed: Mar. 8, 1991

[51] Int. Cl.[5] .......................... H04N 3/14; H04N 5/335
[52] U.S. Cl. .............................. 358/213.19; 358/213.27
[58] Field of Search ...................... 358/213.19, 213.27, 358/213.11, 212; 357/24 LR

[56] References Cited

U.S. PATENT DOCUMENTS

| | | | |
|---|---|---|---|
| 4,242,599 | 12/1980 | Suzuki | 358/213.19 |
| 4,593,303 | 6/1986 | Dyck et al. | 357/24 LR |
| 4,626,915 | 12/1986 | Takatsu | 357/24 LR |
| 4,670,766 | 6/1987 | Miyata et al. | 357/24 LR |
| 4,688,098 | 8/1987 | Kon et al. | 358/213.19 |
| 4,873,561 | 10/1989 | Wen | 357/24 LR |

OTHER PUBLICATIONS

"Physics of Semiconductor Devices" by Sze, John Wiley & Sons, 1981, pp. 412-427.
"324×487 Schottky-Barrier Infrared Imager" by Konuma et al., IEEE Trans. on Electron Devices, vol. 37, No. 3, Mar. 1990, pp. 629-635.
"Charge Transfer Devices" by Sequin et al., Academic Press, 1975, pp. 142-200.
"160×244 Element PtSi Schottky-Barrier IR-CCD Image Sensor" by Kosonocky et al., IEEE Trans. on Electron Devices, vol. ED-32, No. 8, Aug. 1985, pp. 1564-1573.
"A Controllable Piecewise Linear-Output Circuit for CCD Multiplexers" by Stetson, IEEE Trans. on Electron Devices, vol. ED-32, No. 8, Aug. 1985, pp. 1538-1540.

Primary Examiner—Herbert Goldstein
Assistant Examiner—Wendy R. Greening
Attorney, Agent, or Firm—D. G. Maire

[57] ABSTRACT

Solid state image sensing apparatus including a readout circuit associated with each detector element. The readout circuit includes a clipping gate that operates to drain charge, from a charge storage region associated with the detector element, that is in excess of a potential barrier height of the clipping gate. The barrier height is first maintained at a lower value and then at a higher value during each frame integration period so that intensity range compression of a high level image signal is achieved, while a low level image signal is not affected by the operation of the clipping gate.

26 Claims, 7 Drawing Sheets

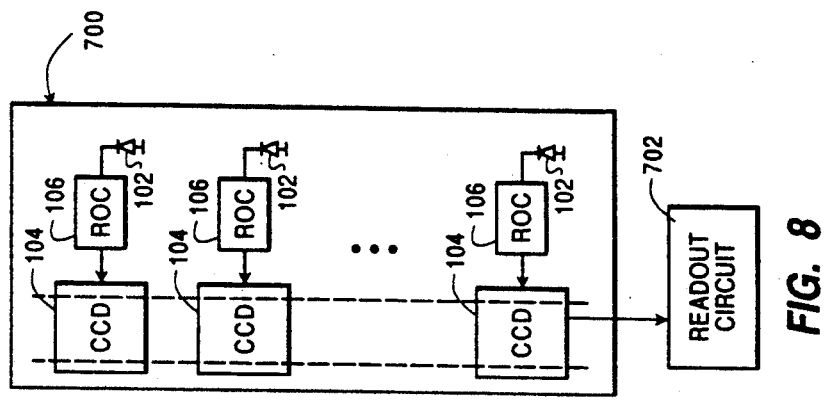
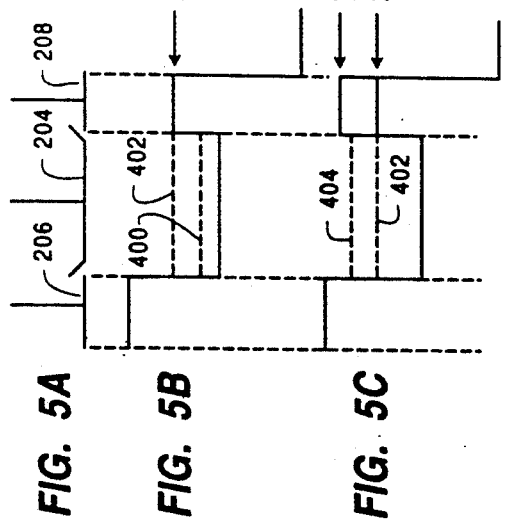
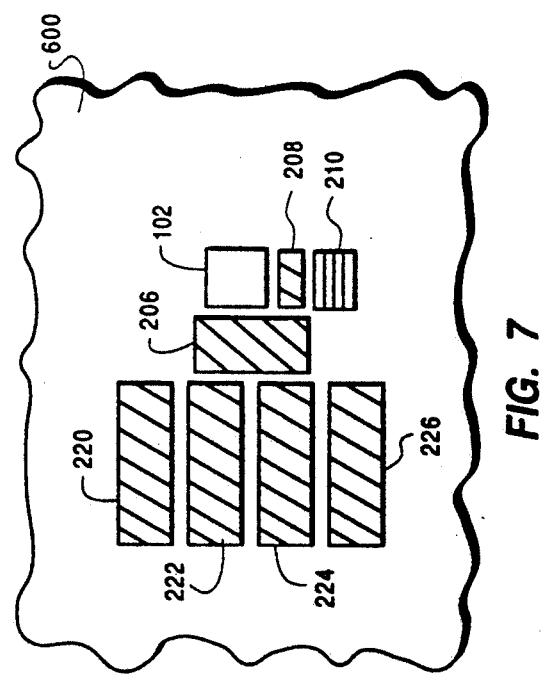

CLIPPED DYNAMIC RANGE COMPRESSION IMAGE SENSING APPARATUS

BACKGROUND OF THE INVENTION

The invention relates generally to solid-state image sensing apparatus and, more particularly, to image sensing apparatus including a readout circuit that compresses high image intensity signal levels.

Solid-state image sensing apparatus is well known. Such sensing apparatus includes a plurality of photosensitive image detector elements. In accordance with well known principles, a charge is generated within each detector element as a function of the amount of electromagnetic radiation that is incident thereon. The plurality of detector elements are typically integrated in a semiconductor substrate as either a linear image sensor or as an area image sensor. The linear image sensor includes a single line of detector elements that can be used to monitor a one-dimensional variable, e.g., liquid level, or that can be used to obtain a two-dimensional image by mechanically scanning the object or scene to be imaged, such as by use of a rotating mirror. The area image sensor, also known in the art as a staring array sensor, is a two-dimensional array of detector elements onto which is projected an image of the object or scene to be imaged.

The composition of the detector elements of the image sensor is determined, in part, by the wavelength of radiation being imaged. For example, in the case of an image sensor for imaging infrared (IR) radiation, the detecting elements can be constructed as $Pd_2Si$ or PtSi Schottky barrier detectors. An example of image sensing apparatus including PtSi detector elements, and a method for making same, is described in "160×244 Element PtSi Schottky-barrier IR-CCD Image Sensor" by *Kosonocky et al.*, IEEE Transactions on Electron Devices, Vol. ED-32, No. 8, August 1985, which is incorporated herein by reference. The detecting elements of a sensor for imaging visible light can, for example, be constructed as a silicon photovoltaic diode.

Solid-state image sensing apparatus also includes solid-state integrated circuitry for reading out signals representative of the image detected by the detector elements. Such readout circuitry can be integrated on the same semiconductors substrate with the detector elements to provide monolithic image sensing apparatus. Alternatively, the readout circuitry can be integrated on a separate substrate which is interconnected with the substrate containing the detector elements to provide hybrid image sensing apparatus. The readout circuitry typically includes a configuration of charge coupled devices (CCD) or switched capacitor circuitry (SCC), although other types of circuitry are known in the art for transporting the charge generated by each detector element to an external image readout terminal. Solid-state image sensing apparatus also includes a region associated with each detector element, for storing the charge generated by that detector element in response to incident electromagnetic radiation. In accordance with known designs of image sensing apparatus, the location of the charge storing region varies with the design of the apparatus. Such locations can include a portion of the structure of the detector element or a region of the substrate in which the readout circuitry is integrated.

In operation, the detector elements of the image sensing apparatus generate charge in response to incident electromagnetic radiation and the generated charge is stored, over a predetermined charge integration period, in the charge storing region. Then, the stored charge is transferred through the readout circuitry to transport the charge associated with each detector element to the external image readout terminal of the imaging apparatus.

Solid-state image sensing apparatus such as described above also frequently includes blooming control circuitry. As is well known in the art, blooming is an overload condition that results from imaging excessively "bright" objects, i.e., objects having a high image intensity. The blooming corresponds to a spreading of the large amount of charge generated by a detector element in response to the high image intensity, such spreading potentially emanating from the charge storing region and/or the readout circuitry, e.g., in the CCDs.

Various solutions are known for minimizing the adverse effects of blooming. One known solution is to drain off the excessive charge, generated by a detector element, that exceeds a maximum charge storage capacity. Disadvantageously, such a solution results in the loss of signal level information for the bright object. Another known solution is to adjust the operation of the image sensing apparatus, such as by providing a shorter image charge integration period, to enable clear imaging of bright objects. Unfortunately, this solution results in a loss of image information corresponding to "dim" objects, i.e., objects having a low image intensity. As used herein, the terms "bright" and "dim" do not refer to a particular portion of the electromagnetic spectrum and are only intended to connote high and low image intensity, respectively.

Attempted solutions to the above described problems of blooming control should preferably require a minimum amount of additional circuit area on the substrate in which the image sensing apparatus is integrated. Also, attempted solutions should preferably not adversely effect the rate at which image information is readout from the image sensing apparatus. Further, attempted solutions should preferably not adversely effect a signal-to-noise ratio associated with the image signals generated for dim objects.

It is therefore an object of the present invention to provide solid-state image sensing apparatus that includes means for imaging objects having a high intensity that is not subject to the aforementioned problems and disadvantages of the prior art.

It is another object of the present invention to provide solid-state image sensing apparatus which does not require significant area on a substrate in which the image sensing apparatus is integrated.

It is a further object of the present invention to provide solid-state image sensing apparatus which does not adversely effect an image readout rate.

It is an additional object of the present invention to provide solid-state image sensing apparatus which is compatible with different types of image information readout circuitry.

SUMMARY OF THE INVENTION

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims.

The present invention overcomes the problems and disadvantages of the prior art by providing a readout circuit for reading out image signal information in an image detector circuit in response to externally generated first and second control signals, the first control signal having first and second magnitudes respectively during first and second portions of an image integration period, the second portion occurring after the first portion. The image detector circuit includes an image detector element that generates an image charge in response to an image and storing means for storing the generated image charge. The readout circuit comprises gate means, operatively coupled to the storing means and responsive to the first control signal, for forming a charge barrier for retaining charge in the storing means, the charge barrier having a barrier height determined by the magnitude of the first control signal. The readout circuit also includes drain means, operatively coupled to the gate means, for draining from the storing means the image charge received during the image integration period by the storing means in excess of the barrier height of the gate means, and readout means, operatively coupled to the storing means, for reading out the stored image charge in response to the second control signal following completion of the integration period. The first and second magnitudes of the first control signal respectively cause formation of first and second barrier heights of the gate means, the second barrier height being greater than the first barrier height.

The accompanying drawings which are incorporated in and constitute a part of this specification, illustrate embodiments of the inventions and, together with the description, serve to explain the principles of the invention.

BRIEF DESCRIPTION OF THE DRAWINGS

FIGS. 5A-5C illustrate charge potentials occurring in the circuit illustrated in FIG. 2A during operation of the apparatus illustrated in FIG. 1;

FIG. 7 illustrates a plan view of a physical arrangement of circuit elements of a readout circuit constructed in accordance with another embodiment of the invention;

FIG. 8 illustrates a linear image sensor constructed in accordance with an embodiment of the invention;

DESCRIPTION OF THE PREFERRED EMBODIMENT

Reference will now be made in detail to the present preferred embodiment of the invention, an example of which is illustrated in the accompanying drawings. Whenever possible, the same reference numbers will be used throughout the drawings to refer to the same or like parts.

In accordance with the illustrated embodiments of the present invention, there is provided solid-state image sensing apparatus having a readout circuit, associated with each detector element, that includes a clipping gate. The clipping gate operates to clip, or drain, charge from a charge storage region associated with the detector element, that is in excess of a potential barrier height of the clipping gate. As more fully described below, the clipping gate potential barrier height is maintained at a first lower value during a first longer portion of a frame integration period, so that generated charge corresponding to a bright object is clipped to the extent it exceeds the first barrier height, while charge corresponding to dim objects is fully accumulated. During a second shorter portion of the frame integration period, the clipping gate potential barrier height is maintained at a second higher value so that additional charge can be accumulated for all objects being imaged. As a result, advantageously, intensity range compression of the image is achieved without any loss of signal information for dim objects and compression of signal information corresponding to bright objects.

Figure 1:
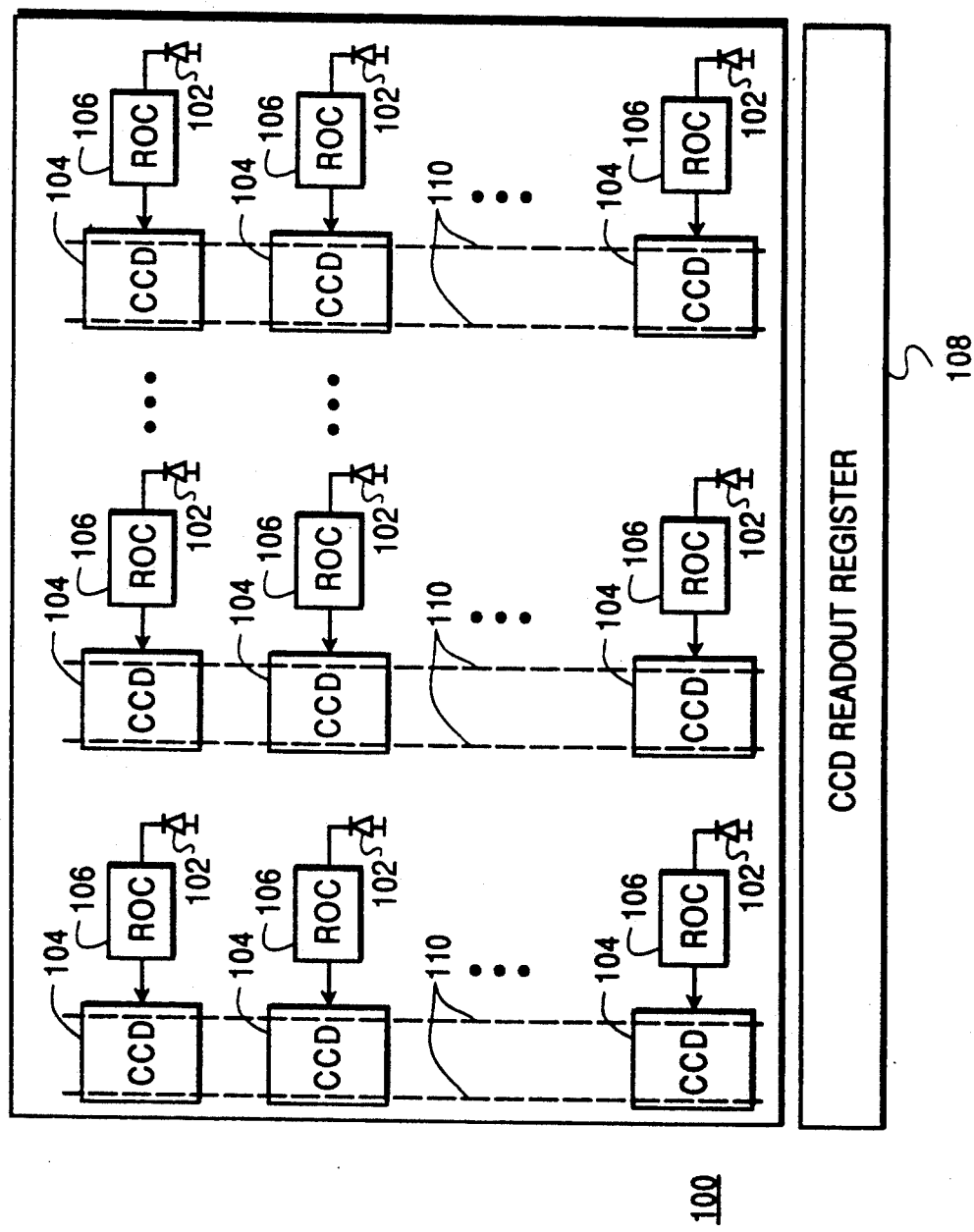
FIG. 1 diagrammatically illustrates image sensing apparatus constructed in accordance with an embodiment of the present invention.

Referring now to the drawings, FIG. 1 diagrammatically illustrates image sensing apparatus 100 constructed in accordance with an embodiment of the present invention. Apparatus 100 comprises an area image sensor including a plurality of photosensitive image detector elements 102 that are integrated in a first common substrate and arrayed in matrix fashion in rows and columns. For example and without limitation, detector elements 102 can be provided as an array of 128×128 elements. Detector elements 102 are preferably constructed to be responsive to infrared (IR) radiation, although the invention is not so limited. Detector elements 102 can be constructed from a III-V compound such as InSb, as more fully described below, although they can also by provided as other IR responsive elements such as the previously described PtSi Schottky barrier type detector elements.

Each detector element 102 is coupled to a charge coupled device (CCD) region 104 through readout control (ROC) circuit 106. It is preferred herein that apparatus 100 be provided as hybrid image sensing apparatus, with CCD regions 104 and ROC circuits 106 integrated in a second common substrate different from the first substrate in which elements 102 are integrated. The invention can be practiced with equal effectiveness with monolithic image sensing apparatus. CCD regions 104 and respective associated ROC circuits 106 are, like detectors 102, also arrayed in matrix fashion in rows and columns.

The respective CCD regions 104 are aligned in columns that are integrated in the second common substrate to define a controllably conductive channel to enable the transfer of charge from CCD region to CCD region, along the column, to enable readout of charge generated by the detector elements 102 via a CCD readout register 108. While the single readout register 108 has been illustrated, it will be understood by those skilled in the art that the actual number of readout registers that can be used advantageously varies as a function of each specific application.

The conductive channel along which each column of CCD regions 104 are aligned, is indicated by the vertically oriented broken lines 110. The operation of aligned CCD regions for the transport and readout of image signals is well known in the art and is not described in detail herein. A general description of CCD characteristics and operation is provided in "Physics of Semiconductor Devices" by S. M. Sze, pages 412-427, John Wiley & Sons, Inc., 1981, which is incorporated herein by reference.

Figure 2A:
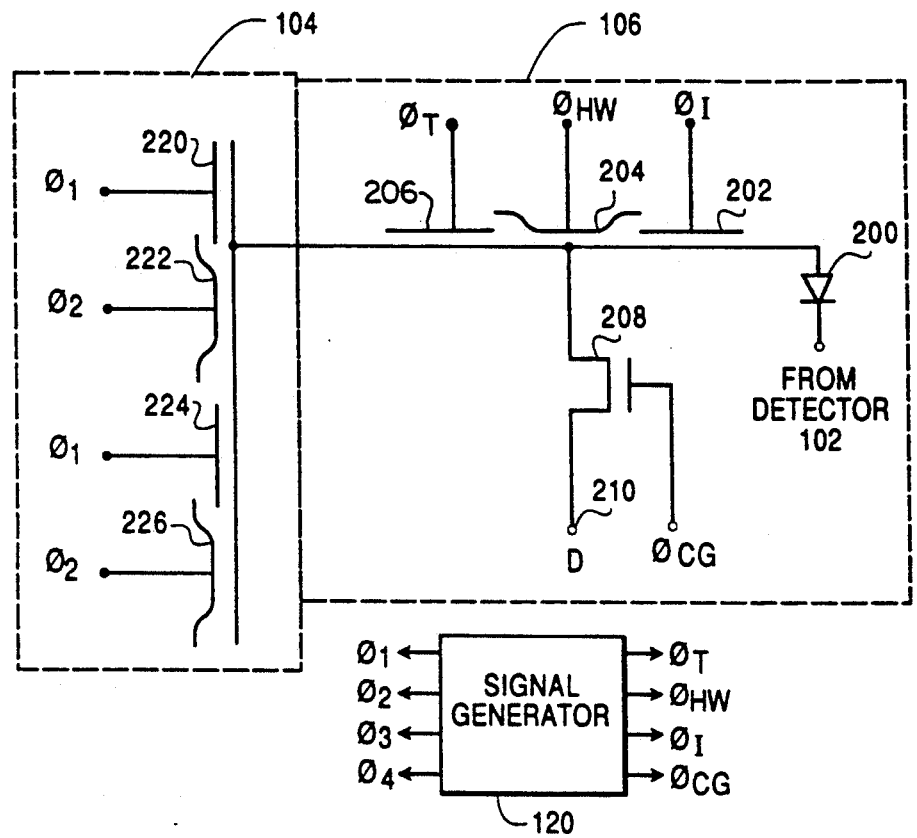
FIG. 2A is a circuit diagram of a readout circuit and a CCD region of the apparatus illustrated in FIG. 1.

FIG. 2A illustrates a circuit diagram of one readout circuit 106 and associated CCD region 104. FIG. 2A also illustrates a signal generator circuit 120 for generating control signals for controlling the operation of image sensing apparatus 100. ROC circuit 106 includes an input diode 200 which is coupled to receive the charge generated by an associated one of detectors 102. Diode 200 serves as a connection to a common channel region, in the second substrate, extending beneath and having a conductivity which is controlled by an input gate 202, a holding well gate 204 and a transfer gate 206. The conductivity beneath input gate 202 is controlled by a signal $\phi_I$ the magnitude of which controls a potential barrier height beneath that gate. The signal $\phi_I$ is preferably continuously maintained at a low magnitude during operation of apparatus 100, as more fully described below. A potential barrier height beneath holding well gate 204 is controlled by a signal $\phi_{HW}$. The signal $\phi_{HW}$ is maintained at a low magnitude during most of each frame integration period when charge is being received from the associated detector 102. In particular, it is intended that the charge received from the associated detector 102 during the frame integration period be accumulated in the channel region beneath holding well gate 204. Thus, in accordance with the illustrated embodiment, the region beneath holding well gate 204 serves as the charge storing region for the associated detector element 102.

The conductivity beneath transfer gate 206 is controlled by a signal $\phi_T$ the magnitude of which controls a potential barrier height beneath that gate. Preferably, during each frame integration period, the respective magnitudes of $\phi_I$ and $\phi_{HW}$ are maintained low to cause the storage of charge beneath holding well gate 204. During the same time, the magnitude of signal $\phi_T$ is maintained at a high value to create a high potential barrier in the channel region beneath gate 206 to confine the charge being accumulated and stored beneath holding well gate 204.

ROC circuitry 106 further includes a clipping gate 208 for controlling the conductivity of a channel region beneath it that adjoins, at one end, the channel region beneath holding well gate 204. The other end of the channel region beneath clipping gate 208 is coupled to a drain 210 that represents a conductive path for draining charge to an external voltage supply. A potential barrier height beneath clipping gate 208 is controlled by a signal $\phi_{CG}$ such that charge can be controllably drained from beneath holding well gate 204 by varying the magnitude of signal $\phi_{CG}$.

CCD region 104 is preferably provided as a four phase CCD structure including four CCD electrodes 220, 222, 224 and 226 that are respectively controlled by signals $\phi_1$, $\phi_2$, $\phi_3$ and $\phi_4$. CCD electrodes 222 and 224 are aligned to both receive charge stored beneath holding well gate 204, via transfer gate 206, following completion of each frame integration period. The mechanism and operation of charge transport by multiphase CCDs is well known in the art, being described in the above noted reference by Sze, and is not further described herein.

Figure 2B:
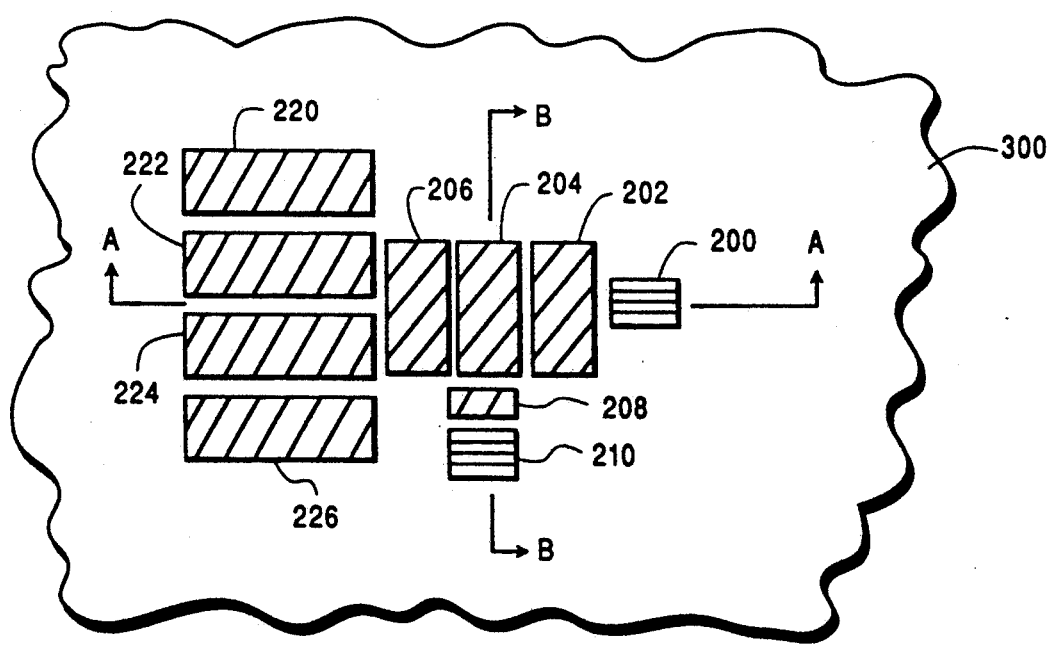
FIG. 2B diagrammatically illustrates a plan view of a physical arrangement of the circuit elements illustrated in FIG. 2A.
Figure 3A:
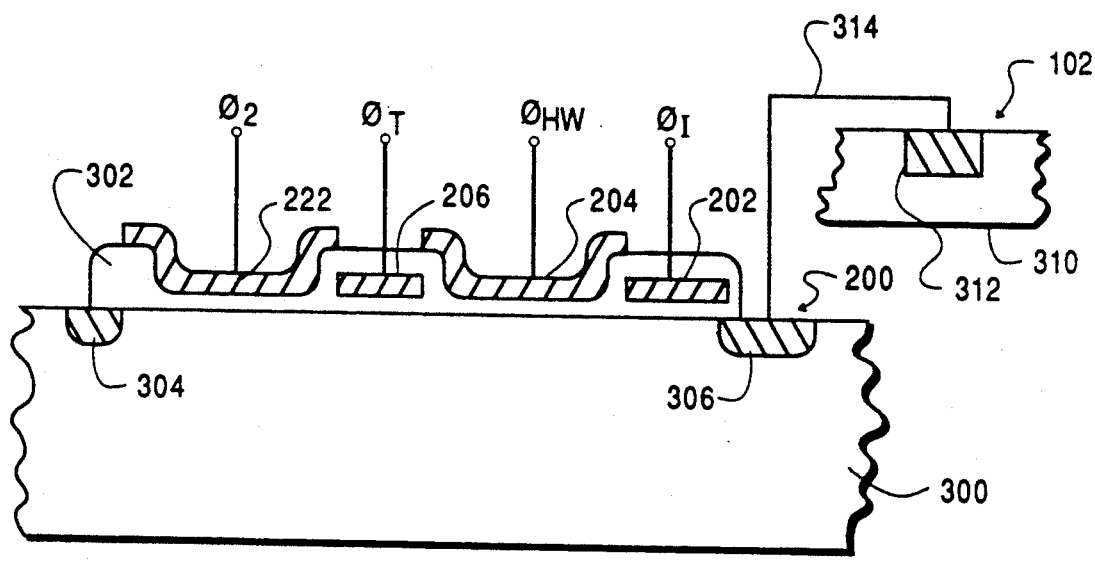
FIG. 3A illustrates section A—A indicated in FIG. 2B.
Figure 3B:
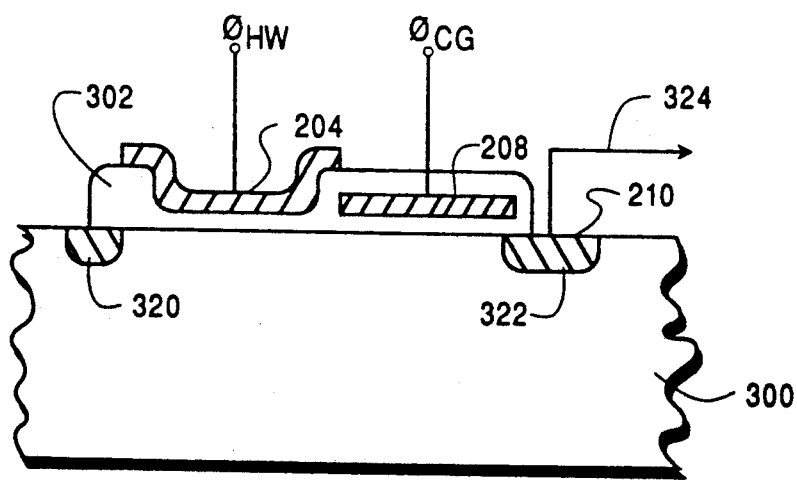
FIG. 3B illustrates section B—B indicated in FIG. 2B.

The construction of CCD region 104, and ROC circuitry 106 in the second common substrate, provided as a common substrate 300, is illustrated in greater detail in FIGS. 2B, 3A and 3B. FIG. 2B diagrammatically illustrates a plan view of a physical arrangement of the circuit elements of ROC circuit 106 and CCD region 104 in common substrate 300. FIGS. 3A and 3B respectively illustrate section views A—A and B—B denoted in FIG. 2B. Although as shown in FIGS. 3A and 3B the electrodes of the various gates overlap, such gate electrodes are, for clarity only, illustrated in FIG. 2B with spaces between them. Substrate 300 is fabricated of single crystal silicon and doped to have an n-type conductivity by a suitable dopant, such as phosphorus. Substrate 300 is preferably doped to achieve a dopant concentration of approximately $5 \times 10^{14} \text{cm}^{-3}$.

Gates 202, 204, 206 and 208 and CCD electrodes 220-226 are all preferably fabricated from polysilicon and are illustrated with the same cross-hatching in the Figures to indicate this. As seen in FIGS. 3A and 3B, gates 202-208 and CCD electrodes 220-226 are insulated from substrate 300 by a gate dielectric layer 302 consisting of a layer of $SiO_2$ and a layer of Si thereover. As described above and illustrated in FIG. 2B, CCD electrodes 222 and 224 are aligned with transfer gate 206 to both receive the charge transferred beneath holding well gate 204 following completion of the frame integration period. The respective electrodes are insulated from each other by a layer 303 of $SiO_2$.

Referring to FIG. 3A, the channel beneath the CCD electrodes is bound by a channel stop region 304 of n+ conductivity. A suitable dopant for forming channel stop region 304 is phosphorus, and region 304 is preferably doped to achieve a dopant concentration of approximately $1 \times 10^{19} \text{cm}^{-3}$. As also seen in FIG. 3A, diode 200 is formed as a p+ high conductivity region 306. A suitable dopant for forming region 306 of diode 200 is boron, deposited to a concentration of approximately $5 \times 10^{18} \text{cm}^{-3}$. High conductivity region 306 of diode 200 serves as a conductive contact to the channel region extending beneath input gate 202 so that charge received from detector element 102 can be transported into the channel beneath input gate 202.

For illustrative purposes, an exemplary one of detector elements 102 is also shown in FIG. 3A integrated in the first common substrate provided as a substrate 310. In the case of the above noted InSb detector element, substrate 310 is composed of InSb and is doped with tellurium, to a concentration of approximately $5 \times 10^{14} \text{cm}^{-3}$, to have an n-type conductivity, while a region 312 corresponding to the photogenerated signal collection region of the detector is doped with beryllium, to a concentration of approximately $1 \times 10^{18} \text{cm}^{-3}$, to have a p-type conductivity. A conductive path 314 is diagrammatically shown between substrates 300 and 310 and makes ohmic contact at its respective ends which detector elements 102 and diode 200. Conductive path 314 thereby serves to transport the charge generated by element 102 to diode 200 of readout circuitry 106. Methods for conductively connecting respective substrates are well known in the art, e.g., by wire bonding or bump bonding.

Referring to FIG. 3B, an n+ region 320 is provided as a channel stop to confine charge beneath gates 202, 204 and 206. Region 320 is formed by the same type of doping as described above for region 304. Drain 210 is formed, in part, as a p+ high conductivity region 322 which is formed by the same doping as described above for region 306. Region 322 therefore serves as a conductive contact to the channel region beneath clipping gate 208. A conductive path 324 is illustrated for conducting charge that is drained from the region beneath holding well gate 204 by control of signal $\phi_{CG}$. Conductive path 324 can be provided as a metallized bus line common to the drains of the respective ROC circuits 106 and connected externally to a DC power supply. It is preferred herein that clipping gate 208 be wide enough, e.g., 5 $\mu$m or greater, to assure it can conduct charge to drain 210 at a sufficient rate to prevent any accumulation of charge beneath clipping gate 208. Such charge accumulation could adversely affect the accuracy of the image signal output transfer function.

Signal generator circuit 120 can be provided as a digital application specific integrated circuit or a digital timing generator.

A method for fabricating the array of CCD regions 104 and ROC circuits 106 in substrate 300 is described next. First, a suitably doped n-type silicon substrate, to serve as substrate 300, is either fabricated or acquired. Next, a major surface of substrate 300 is photolithographically masked to define areas in the substrate corresponding to n+ channel stop regions 304 and 320. The areas for channel stop regions 304 and 320 are then doped to the required concentrations by, for example, an ion implantation technique. Next, the mask for the n+ channel stop regions is removed and the surface of substrate 300 is photolithographically masked to define areas in the substrate corresponding to high conductivity p+ regions 306 and 322. The areas for regions 304 and 322 are then doped to the required concentrations, preferably by an ion implantation technique, and the mask is removed.

The required respective depths of regions 304, 306, 320 and 322 are specific to each application and require a controlled annealing period to be achieved. Such annealing may be performed as a discrete step, or may be accomplished during the performance of a subsequent step during which the temperature of the substrate is suitably elevated.

Following formation of regions 304, 306, 320 and 322, successive layers of silicon dioxide and silicon nitride are grown on the substrate to serve as a gate dielectric layer. Then a gate conductor layer of polysilicon, corresponding to a first level of gates, is deposited over the gate dielectric layer and doped, e.g., with phosphorus, by a diffusion process. Next, the gate conductor layer is photolithographically masked and then etched to define the first level polysilicon gates, i.e., gates 202, 206, 208, 220 and 224. Following this step, the mask is removed and a layer of $SiO_2$ is grown on the first level gates.

Next, a gate conductor layer of polysilicon corresponding to a second level of gates, is deposited over the grown $SiO_2$ layer and doped as described for the first level of gates. This conductive layer is photolithographically masked to define the second level polysilicon gates, i.e., gates 204, 222 and 226. The masked surface is then etched to define the second level gates, after which the mask is removed.

Next a layer of $SiO_2$ is deposited over the entire surface of the substrate. This layer of $SiO_2$ is not shown in the Figures but is deposited to serve as a dielectric layer between subsequently formed metallized lines and the previously formed underlying structure. This layer of $SiO_2$ is photolithographically masked to define contact window regions for making contact with the underlying gates, n+ channel stops and p+ conductivity regions, as appropriate. The window regions are then etched and the mask is removed.

A layer of conductive metal, e.g., aluminum, is then deposited over the surface including in the contact windows. The aluminum layer is photolithographically masked and etched to define the required conductive metal interconnections. After removal of the mask, another layer of $SiO_2$ (not shown) is deposited over the metal interconnection layer. Masking and etching are then performed, as described above, to fabricate bonding pads for external connections to the circuit.

Figure 4:
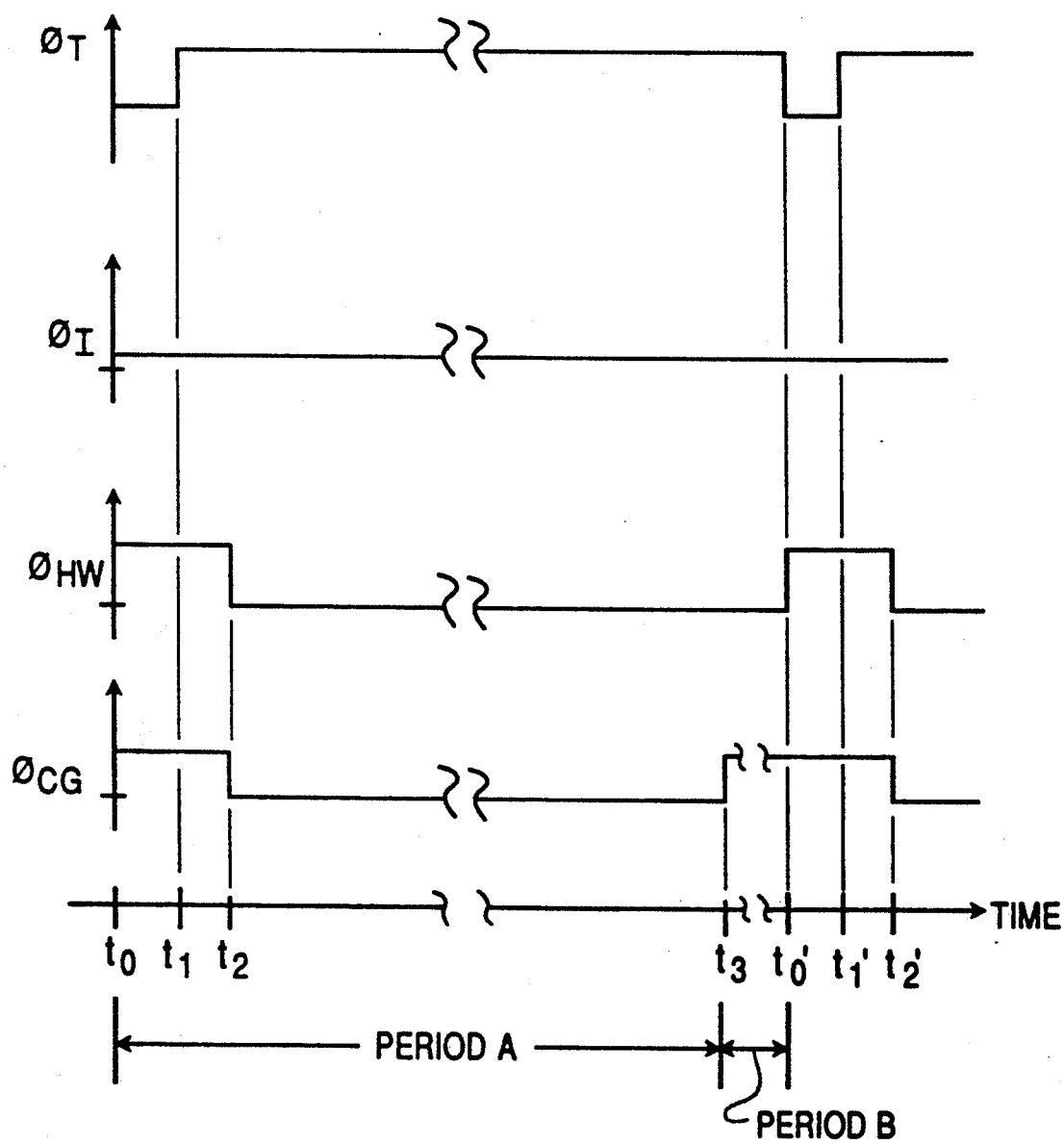
FIG. 4 is a timing diagram illustrating signals for controlling the operation of the apparatus illustrated in FIG. 1.

The operation of image sensing apparatus 100 is described next with reference to FIGS. 4 and 5A–5C. FIG. 4 is a timing diagram illustrating the relative values and timing of the signals $\phi_T$, $\phi_I$, $\phi_{HW}$, and $\phi_{CG}$ during operation of apparatus 100. In FIG. 4, the frame integration period commences at a time $t_0$ and ends at a time $t_0'$ when the next frame integration period commences, so that, as preferred herein, there is no dead-time between successive frame integration periods. As previously described, charge generated by each detector element 102 during each frame integration period is stored in the region beneath holding well gate 204 of the associated ROC circuit 104. Readout of the stored charge via CCD regions 104 and CCD register 108 is commenced upon completion of the frame integration period at time $t_0'$.

Except for a very brief period extending from $t_0$ to $t_1$ at the beginning of the frame integration period, signal $\phi_T$ is controlled to have a relatively large magnitude throughout the frame integration period in order to confine the charge being accumulated and stored beneath holding well gate 204. At the end of the frame integration period, at time $t_0'$, the magnitude of signal $\phi_T$ is reduced to a low value to enable the transfer of the charge stored beneath holding well gate 204 to the channel region beneath CCD electrodes 222 and 224. The respective magnitudes of signals $\phi_1$–$\phi_4$ applied to the CCD electrodes are controlled in a well known manner to promote the charge transfer from beneath holding well gate 204. As seen in FIG. 4, the magnitude of signal $\phi_T$ is returned to a high value at time $t_1'$ which occurs a very brief time after the commencement of the next frame integration period. Thus, the reduced magnitude of signal $\phi_T$ during the time period extending from $t_0$ to $t_1$ corresponds to a transfer of charge stored during the previous frame integration period that ended at $t_0$.

As previously described, signal $\phi_I$ is preferably maintained at a relatively low magnitude throughout operation of apparatus 100. Signal $\phi_I$ is preferably so maintained since an increase in the magnitude of that signal would tend to interrupt the current flow from the associated detector 102 resulting in the accumulation of charge on the detector itself. The potential developed on the detector due to such charge accumulation would cause the detector to cease operation because of the reduced bias voltage across it.

Still referring to FIG. 4, except for a very brief period extending from $t_0$ to $t_2$ at the beginning of the frame integration period, signal $\phi_{HW}$ is controlled to have a relatively low magnitude during the frame integration period to provide a low potential barrier height to enable the storage of charge beneath holding well gate 204. Upon completion of the frame integration period, at time $t_0'$, the magnitude of signal $\phi_{HW}$ is increased in order to transfer the charge stored beneath holding well gate 204 to the region beneath CCD electrodes 222 and 224 via the region beneath transfer gate 206. As noted above, the respective magnitudes of signals $\phi_T$ and $\phi_1$–$\phi_4$ are also appropriately adjusted to promote this charge transfer. As seen in FIG. 4, the magnitude of signal $\phi_{HW}$ is returned to a low value at time $t_2'$, a very brief period after the commencement of the next frame integration period. Thus, the increased magnitude of signal $\phi_{HW}$ during the time period extending from $t_0$ to $t_2$ corresponds to the transfer of charge stored during the previous frame integration period that ended at $t_0$.

As noted above, signals $\phi_T$ and $\phi_{HW}$ are respectively maintained at relatively low and high magnitudes at the beginning of each frame integration period to transfer the charge stored during the previous frame integration period. During this relatively brief period, the charge being generated by detector element 102 during the current frame integration period is stored beneath input gate 202. Then at time $t_2$ when the magnitude of signal $\phi_{HW}$ is returned to a relatively low magnitude, the charge accumulated beneath input gate 202 is transferred to the region beneath holding well gate 204.

In accordance with a preferred embodiment of the present invention, clipping gate 208 is operated to control the amount of charge stored beneath holding well gate 204 during the frame integration period. Further in accordance with the preferred embodiment, such control is divided into two periods that together constitute the entire frame integration period. As illustrated in FIG. 4, the first of these two periods is denoted period A and extends from $t_0$ to $t_3$, while the second period follows the first, is denoted period B and extends from $t_3$ to $t_0'$.

FIGS. 5B and 5C are charge potential diagrams that respectively diagrammatically illustrate the accumulation of charge beneath holding well gate 204 during periods A and B. Transfer gate 206, holding well gate 204 and clipping gate 208 are diagrammatically illustrated in FIG. 5A to indicate the extent of each charge potential region in FIGS. 5B and 5C. Referring to FIGS. 4 and 5B, except for a very brief period extending from $t$ to $t_2$, during period A the magnitude of $\phi_{CG}$ is maintained at a first potential that corresponds to a potential barrier height x beneath clipping gate 208. If the charge accumulated beneath gate 204 during period A has a potential that is less than potential x, such as illustrated by a charge potential 400, none of the accumulated charge is drained off via clipping gate 208. However, if an amount of charge conducted to the region beneath gate 204 during period A has a potential that exceeds potential x, then the amount of charge in excess of potential x is conducted to drain 210 via clipping gate 208. In this manner, the maximum amount of charge that can be accumulated beneath holding well gate 204, denoted by a charge potential 402, can be no greater than potential x during period A. As a result, image information corresponding to image charge signal levels in excess of potential x are clipped. At the same time, image information corresponding to lower, less intense image charge signal levels is fully accumulated. As a result, a signal-to-noise ratio for dim objects is not reduced by operation of clipping gate 208.

Referring to FIGS. 4 and 5C, during period B, which is preferably substantially shorter than period A, the magnitude of signal $\phi_{CG}$ is increased to a second potential that corresponds to a potential barrier height y, beneath clipping gate 208, that is greater than potential x. During the shorter period B, additional charge generated by associated detector 102 is stored beneath holding well gate 204 to the extent it does not exceed potential y. For example, as shown in FIG. 5C, assuming that charge potential 402 is accumulated during period A, then additional charge accumulated and stored during period B increases the potential beneath holding well gate 204 to a charge potential 404 which is less than potential y. In this manner, charge generated by the associated detector 102 during period B accumulates beneath holding well gate 204 and will add linearly to the charge accumulated during period A. The provision of the shorter period B for integration results in a compression of image information for signal levels that exceed potential x.

As seen in FIG. 4, it is preferred herein that the magnitude of signal $\phi_{CG}$ be maintained at the second potential for the very brief period extending from $t_0'$ to $t_2'$, or from $t_0$ to $t_2$, upon completion of the frame integration period. Signal $\phi_{CG}$ is so controlled in order to assure that no accumulated charge from the completed frame integration period is inadvertently drained while being read out.

As previously described and as illustrated in FIGS. 5B and 5C, the potential barrier height beneath transfer gate 206 is maintained at a high level during the frame integration period to confine the charge accumulated beneath holding well gate 204. It is further preferred herein that potential barrier height y beneath clipping gate 208 be selected to be less than the potential barrier height beneath transfer gate 206 during the frame integration period and to provide blooming control by clipping gate 208. That is, potential y corresponds to a charge level that if otherwise exceeded would lead to blooming in the CCDs or in the region surrounding the region beneath holding well gate 204.

Without limitation, exemplary values of the amount of charge accumulated corresponding to potentials x and y are $2 \times 10^6$ electrons and $3 \times 10^6$ electrons, respectively. An exemplary duration for the total frame integration period is 1/30 second. Further without limitation, it is preferred herein that period B have a value in the range between 1% and 10% of the total frame integration period. An exemplary duration for each very brief period extending from $t_0$ to $t_1$ (or $t_0'$ to $t_1'$) and from $t_1$ to $t_2$ (or $t_1'$ to $t_2'$) is 500 nanoseconds.

Figure 6:
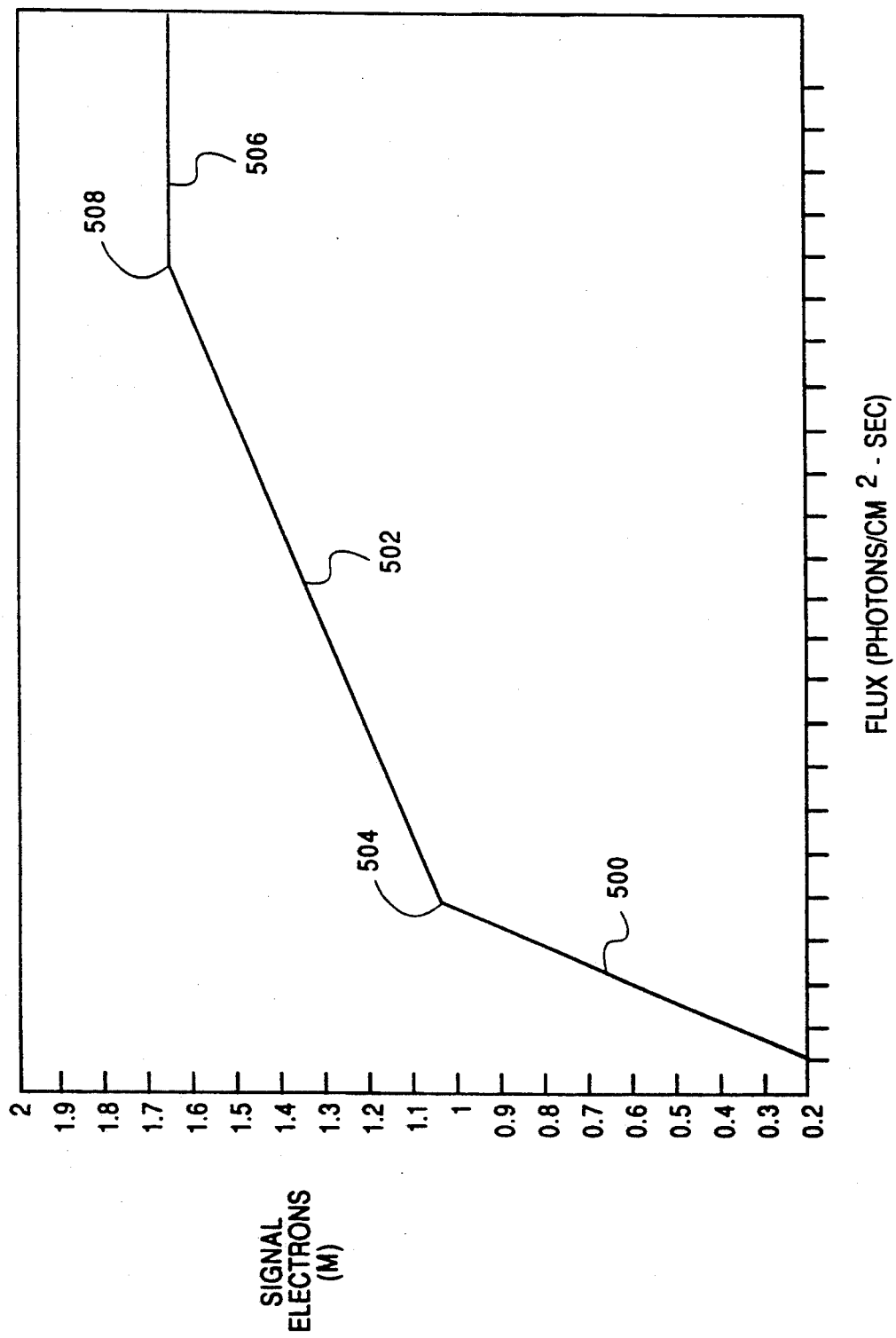
FIG. 6 illustrates an operating characteristic of image sensing apparatus constructed in accordance with the present invention.

FIG. 6 graphically illustrates an exemplary operating characteristic of a single detector 102 and associated ROC circuit 106 and CCD region 104 constructed in accordance with the invention. The operating characteristic is represented by a graph of the number of signal electrons (millions of electrons) generated by detector 102 and accumulated beneath holding well gate 204 plotted as a function of radiation flux (photons/cm$^2$-sec). The characteristic includes two linear portions 500 and 502 having different slopes and forming a knee at point 504. The characteristic also includes a saturation portion 506 that meets portion 502 at a point 508.

Portion 500 corresponds to the accumulation of charge during period A of the frame integration period. The slope of portion 500 varies directly with the duration of period A. That is, as the duration of period A is increased, the slope of portion 500 increases, i.e., becomes steeper. Portion 502 corresponds to the accumulation of charge during period B of the frame integration period. The slope of portion 502 varies inversely with the duration of period A since, in the preferred embodiment, periods A and B constitute the entire frame integration period, so that period B decreases as period A increases. That is, as the duration of period A is increased, the slope of portion 502 decreases, i.e., becomes shallower.

Portion 506 corresponds to a saturation region that would occur during period B if the amount of charge accumulated exceeds potential y (FIG. 5C). Thus, an operating point on portion 506 represents the performance of blooming control by clipping gate 208.

The nature of the characteristic illustrated in FIG. 6 further depends on the respective values of potentials x and y (FIGS. 5B and 5C). In particular, the location of the knee at point 504 shifts along a line, constituted by portion 500 and an extension thereof, to a higher or lower value as potential x is respectively increased or decreased. Also, the location of point 508, from which portion 506 extends, shifts along a line, constituted by portion 502 and an extension thereof, to a higher or lower value as potential y is respectively increased or decreased.

While a preferred embodiment of the invention has been described with respect to image sensing apparatus 100 provided as hybrid image sensing apparatus, the invention is not so limited. Image sensing apparatus 100 illustrated in FIG. 1 can instead be provided as monolithic image sensing apparatus. FIG. 7 illustrates a plan view of a physical arrangement of the circuit element of a signal detector 102, ROC circuit 106 and CCD region 104 all integrated in a common substrate 600. As seen in FIG. 7, the arrangement of circuit elements required for the monolithic image sensing apparatus is similar to that which was described above with respect to FIG. 2A, 2B, 3A and 3B for hybrid apparatus, with the exception that input diode 200, input gate 202 and holding well gate 204 are not required. Instead, charge generated by a detector 102 is accumulated in a portion of the detector structure. For example, the structure of the above noted PtSi Schottky barrier detector can include an n+ guard ring that forms a diode with the p-type substrate, so that generated charge can be accumulated on that diode. For the reasons discussed above, it is preferred herein that charge not be accumulated proximate the junction of the detector itself.

In accordance with the operation of the monolithic imaging apparatus illustrated in FIG. 7, signal $\phi_{CG}$ is applied to clipping gate 208 to preferably control the gate in the same manner as described above during first and second frame integration periods. As a result, the operating characteristic of the monolithic image sensing apparatus has the same form as illustrated in FIG. 6. Upon completion of the frame integration period, the magnitudes of signals $\phi_T$, $\phi_2$ and $\phi_3$ applied to transfer gate 206 and CCD electrodes 222 and 224, respectively, are reduced, so that the accumulated charge can be transferred to the CCDs for readout.

While a preferred embodiment as been illustrated as comprising an area image sensor, the invention is not so limited. The invention can be practiced with equal effectiveness to perform image intensity range compression in a linear array. FIG. 8 illustrates image sensing apparatus 700 comprising a linear image sensor. Apparatus 700 comprises a single line of detector elements 102 each coupled with a respective ROC circuit 106 and CCD region 104. Apparatus 700 can be constructed and operated as either hybrid or monolithic apparatus such as described above. A readout circuit 702 is provided to receive and process a serial readout of image information from the respective CCD regions 104.

Figure 9:
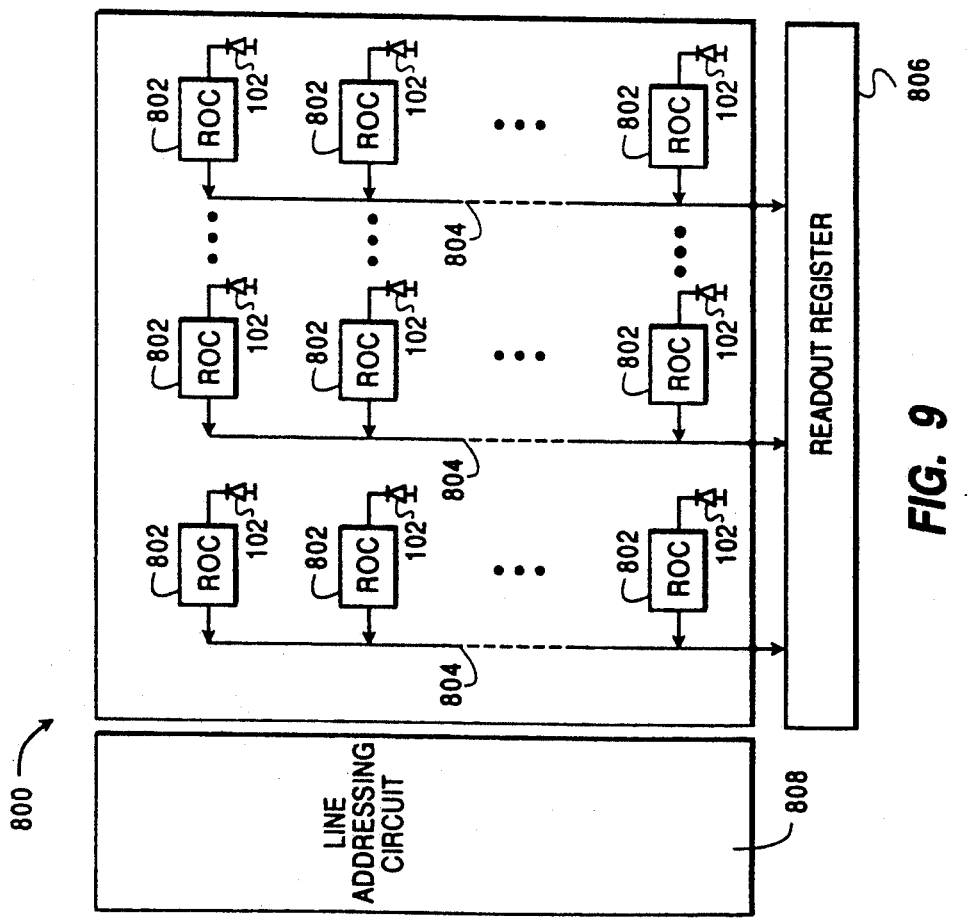
FIG. 9 illustrates image sensing apparatus including switched capacitor readout circuitry.

While the illustrated embodiments described above each include CCDs for reading out image information, the invention is not so limited. The invention can be practiced with equal effectiveness with switched capacitor readout circuitry. FIG. 9 diagrammatically illustrates exemplary image sensing apparatus 800 that includes a plurality of detector elements 102 and ROC circuits 802 that include switched capacitor readout circuitry. A plurality of readout bus lines 804 are provided for transferring image information generated by each detector 102 to a readout circuit 806. For simplicity, circuitry required for addressing the individual ROC circuits 802 to read out the image information is only shown diagrammatically as line addressing circuit 808, the nature of such circuitry being well known in the art.

Figure 10:
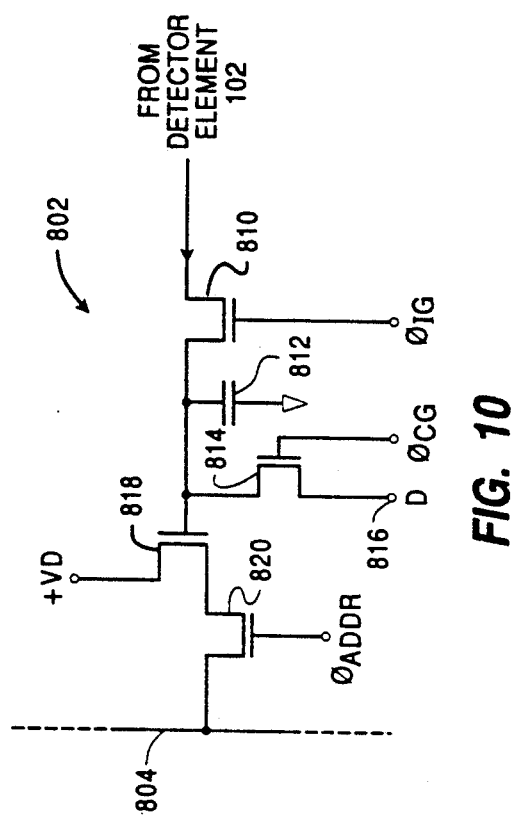
FIG. 10 illustrates a readout circuit of the apparatus illustrated in FIG. 9.

FIG. 10 diagrammatically illustrates a single ROC circuit 802, of apparatus 800, that is preferably integrated in a common semiconductor substrate. ROC circuit 802 includes an MOS input transistor 810 for receiving the flow of charge generated by detector element 102. The operation of gate 810 is controlled by a signal $\phi_{IG}$. ROC circuit 802 also includes a capacitor 812 for storing the charge generated by detector element 102 during the frame integration period and an MOS clipping transistor 814 connected to a drain 816 to controllably drain charge stored in capacitor 812 to the extent such stored charge has a potential that exceeds a potential barrier height of transistor 814. Thus, transistor 814 operates as a clipping gate in a manner analogous to the clipping gate of the previously described embodiments. The potential barrier height of transistor 814 is controlled by the magnitude of signal $\phi_{CG}$. The potential of the charge stored in capacitor 812 is applied to the gate of a MOS bus driver transistor 818 having a drain terminal connected to bus line 804 through a read transistor 820. A bus drive potential $V_D$ is applied to a source terminal of transistor of 818. Read transistor 820 is controlled by the magnitude of an address signal $\phi_{ADDR}$ and enables the selective readout of image information.

In the operation of image sensing apparatus 800, signal $\phi_{CG}$ is applied to transistor 814 to preferably control it to operate in the manner described above during first and second frame integration periods to control the amount charge stored in capacitor 812. Signal $\phi_{IG}$ is preferably maintained at a low potential magnitude at all times, i.e., during the frame integration period and readout following the integration period, so that it is fully conductive and does not restrict the flow of charge generated by detector 102. During the readout of image information following the frame integration period, the signal applied to bus line 804 is proportional to the amount of charge stored in capacitor 812, such charge constituting the image information detected by the associated detector element 102 as compressed by the clipping operation of transistor 814. The operating characteristic of image sensing apparatus 800 is substantially the same as illustrated in FIG. 6.

While embodiments have been described above in which the clipping gate is controlled by two different potential values during the frame integration period, the invention is not so limited. The frame integration period can be divided into an arbitrary number of periods respectively corresponding to different values of $\phi_{CG}$ to the extent that the resulting operating characteristic beneficially compresses the range of image intensity.

While embodiments of the present invention have been described above in which the same value of signal $\phi_{CG}$ is applied to all of the clipping gates of the image sensing apparatus, it will now be apparent to those skilled in the art that the respective clipping gates of the image sensing apparatus can be controlled to have different potential barrier heights. Such selective control of the clipping gates enables different magnitudes of image intensity range compression in different regions of the sensed image.

Thus, it is intended that the present invention cover the modifications and the variations of this invention provided they come within the scope of the appended claims and their equivalence.

We claim:

1. A readout circuit for reading out image signal information in an image detector circuit in response to externally generated first and second control signals, the first control signal having first and second magnitudes respectively during first and second portions of an image integration period, the second portion occurring after the first portion, said image detector circuit including an image detector element that generates an image charge in response to an image and storing means for storing the generated image charge, said readout circuit comprising:
   gate means, operatively coupled to the storing means and responsive to the first control signal, for forming a charge barrier for retaining charge in the storing means, said charge barrier having a barrier height relative to said storing means determined by the magnitude of the first control signal;
   drain means, operatively coupled to said gate means, for draining from the storing means the image charge received during the image integration period by the storing means in excess of the barrier height of said gate means;
   readout means, operatively coupled to said storing means, for reading out the stored image charge in response to the second control signal following completion of the integration period; and
   the first and second magnitudes of the first control signal respectively causing formation of first and second barrier heights of said gate means, said second barrier height being greater than said first barrier height.

2. The readout circuit of claim 1 wherein said gate means is a first gate means;
   said readout means including:
      means for transporting the stored image charge to an external readout terminal; and
      second gate means, operatively coupled between said storing means and said transporting means and responsive to the second control signal, for providing a conductive path to transfer the stored image charge from said storing means to said transporting means in response to the second control signal.

3. The readout circuit of claim 2 wherein said transporting means comprises a charge-coupled device circuit.

4. The readout circuit of claim 3 wherein the image detector element detects infrared images.

5. The readout circuit of claim 2 wherein a charge barrier height formed by said second gate means is greater than said first and second barrier heights of said first gate means during said image integration period.

6. The readout circuit of claim 1 wherein the total integration period corresponds to the first and second portions; and
   the second portion constitutes no more than approximately 10% of the total of the first and second portions.

7. A readout circuit, for an image detector, for reading out image signal information in response to externally generated first and second control signals, the first control signal having first and second magnitudes respectively during first and second portions of an image integration period, the second portion occurring after the first portion, said readout circuit comprising:
   means for storing an image charge generated by the image detector during the image integration period;
   gate means, operatively coupled to said storing means and responsive to the first control signal, for forming a charge barrier for retaining charge in said storing means, said charge barrier having a barrier height relative to said storing means determined by the magnitude of the first control signal;
   drain means, operatively coupled to said gate means, for draining from said storing means the image charge received by said storing means in excess of the barrier height of said gate means;
   readout means, operatively coupled to said storing means, for reading out the stored image charge in response to the second control signal following completion of the integration period; and
   the first and second magnitudes of the first control signal respectively causing formation of first and second barrier heights of said gate means, said second barrier height being greater than said first barrier height.

8. The readout circuit of claim 7 wherein said gate means is a first gate means;
   said readout means including:
      means for transporting the stored image charge to a readout terminal; and
      second gate means, operatively coupled between said storing means and said transporting means and responsive to the second control signal, for providing a conductive path to transfer the stored image charge from said storing means to said transporting means in response to the second control signal.

9. The readout circuit of claim 8 wherein said transporting means comprises a charge-coupled device circuit.

10. The readout circuit of claim 8 wherein said transporting means comprises a switched capacitor readout circuit.

11. The readout circuit of claims 7, 8, 9, or 10 wherein the image detector detects infrared images.

12. The readout circuit of claim 7 wherein the total integration period corresponds to the first and second portions; and
   the second portion constitutes no more than approximately 10% of the total of the first and second portions.

13. The readout circuit of claim 7 wherein said second barrier height is selected to minimize blooming of a detected image.

14. Image sensing apparatus for sensing an image in response to externally generated first and second control signals, the first control signal having first and second magnitudes respectively during first and second portions of an image integration period, the second portion occurring after the first portion, said apparatus comprising:
- an image detector including a plurality of image detector elements each for detecting a corresponding portion of the sensed image, each said detector element generating an electrical image charge representative of the corresponding image portion during the image integration period;
- a plurality of readout circuits respectively coupled to associated ones of said plurality of image detector elements;
- each said readout circuit including
  - means, operatively coupled to the associated image detector element, for storing the image charge generated by the associated image detector element during the integration period,
  - gate means, operatively coupled to said storing means and responsive to the first control signal, for forming a charge barrier for retaining charge in said storing means, said charge barrier having a barrier height relative to said storing means determined by the magnitude of the first control signal,
  - drain means, operatively coupled to said gate means, for draining from said storing means the image charge received by said storing means in excess of the barrier height of said gate means,
  - readout means, operatively coupled to said storing means, for reading out the stored image charge as a compressed image signal in response to the second control signal following completion of the integration period, and
  - the first and second magnitudes of the first control signal respectively causing formation of first and second barrier heights of said gate means, said second barrier height being greater than said first barrier height; and
- image output circuit means, operatively coupled to said readout means of said plurality of readout circuits, for outputting the compressed image signals provided by said plurality of readout circuits.

15. The image sensing apparatus of claim 14 wherein said gate means is a first gate means;
said readout means including:
- means for transporting said compressed image signal to said image output circuit means; and
- second gate means, operatively coupled between said storing means and said transporting means and responsive to the second control signal, for providing a conductive path to transfer said compressed image signal from said storing means to said transporting means in response to said second control signal.

16. The image sensing apparatus of claim 15 wherein said image detector comprises a linear image sensor array of said image detector elements.

17. The image sensing apparatus of claim 15 wherein said image detector comprises an area image sensor array of said image detector elements.

18. The image sensing apparatus of claims 16 or 17 wherein said transporting means comprises a charge-coupled device circuit.

19. The image sensing apparatus of claim 18 wherein said plurality of image detector elements detect infrared images.

20. The image sensing apparatus of claims 16 or 17 wherein said transporting means comprises a switched capacitor readout circuit.

21. The image sensing apparatus of claim 20 wherein said plurality of image detector elements detect infrared images.

22. The image sensing apparatus of claim 14 wherein the total integration period corresponds to the first and second portions; and
the second portion constitutes no more than approximately 10% of the total of the first and second portions.

23. The image sensing apparatus of claim 14 wherein said second barrier height is selected to minimize blooming of the sensed image.

24. The image sensing apparatus of claim 14 wherein the first and second magnitudes of the first control signal are identically applied to the respective gate means of said plurality of readout circuits.

25. The image sensing apparatus of claim 14 wherein said image detector and said plurality of readout circuits are integrated in a common semiconductor substrate.

26. Image sensing apparatus for sensing an infrared image in response to externally generated first and second control signals, the first control signal having first and second magnitudes respectively during first and second portions of an image integration period, the second portion occurring after the first portion, said apparatus comprising:
- an image detector including a plurality of infrared image detector elements each for detecting a corresponding portion of a sensed infrared image, each said detector element generating an electrical image charge representative of the corresponding image portion during the image integration period;
- a plurality of readout circuits respectively coupled to associated ones of said plurality of image detector elements;
- each said readout circuit including
  - means, operatively coupled to the associated image detector element, for storing the image charge generated by the associated image detector element during the integration period,
  - first gate means, operatively coupled to said storing means and responsive to the first control signal, for forming a charge barrier for retaining charge in said storing means, said charge barrier having a barrier height determined by the magnitude of the first control signal,
  - drain means, operatively coupled to said first gate means, for draining from said storing means the image charge received by said storing means in excess of the barrier height of said first gate means,
  - readout means, operatively coupled to said storing means, for reading out the stored image charge as a compressed image signal in response to the second control signal following completion of the integration period, and
  - the total integration period corresponding to the first and second portions, the second portion constituting no more than approximately 10% of the total of the first and second portions, the first and second magnitudes of the first control signal respectively causing formation of first and second barrier heights of said first gate means, said second barrier height being greater than said first barrier height;

image output circuit means, operatively coupled to said readout means of said plurality of readout circuits, for outputting the compressed image signals provided by said plurality of readout circuits; and said readout means including charge coupled device means for transporting said compressed image signal to said image output circuit means, and second gate means, operatively coupled between said storing means and said charge coupled device means and responsive to the second control signal, for providing a conductive path to transfer said compressed image signal from said storing means to said charge coupled device means in response to the second control signal.

* * * * *